April 16, 1957 G. F. ZIFFER 2,789,162

WAVE AMPLIFYING CIRCUITS

Filed March 1, 1952

Inventor:
Garret F. Ziffer,
by Merton D. Moore
His Attorney.

United States Patent Office 2,789,162
Patented Apr. 16, 1957

2,789,162

WAVE AMPLIFYING CIRCUITS

Garret F. Ziffer, Cambridge, Mass., assignor to General Electric Company, a corporation of New York Application March 1, 1952, Serial No. 274,406

4 Claims. (Cl. 179—171)

Figure 1:
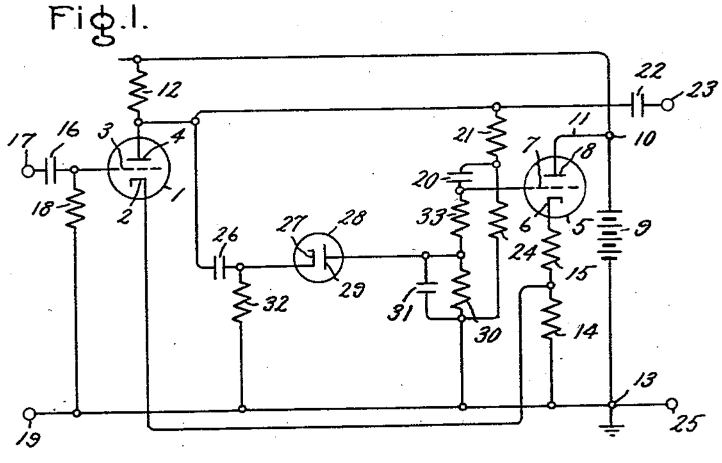

The present invention relates, in general, to wave amplifying circuits and in particular it relates to amplifiers, oscillators and the like which depend for their operation on the use of regenerative feedback.

Wave translating apparatus of this character in which a portion of the waves from the output of the apparatus is applied to the input of the apparatus in a phase relationship to re-enforce the waves appearing at the input of the apparatus are well known in the art. This kind of apparatus has a tendency to be unstable in operation. For example, a random increase in the amplification of an amplifier having regenerative feedback causes an increase in the amplitude of the waves applied from the output circuit of the amplifier to the input circuit of the amplifier to cause a further increase in the amplification of the amplifier, thereby accentuating the initial random increase in amplification.

The present invention is directed in its particular aspects to overcoming disadvantages of this character in apparatus making use of regenerative feedback.

Accordingly, it is an object of the present invention to provide improvements in amplifiers, oscillators and the like making use of regenerative feedback.

It is also an object of the present invention to provide improvements in wave translating apparatus.

In an exemplary embodiment of my invention an electron discharge amplifier is provided. An electron discharge device is also provided to couple the output circuit of the electron discharge amplifier to the input circuit of the amplifier in a manner to reinforce waves applied to the input circuit. An attenuator is connected between the output circuit of the first amplifier and the input circuit of the electron discharge device to attenuate the waves applied to the latter device. The waves from the amplifier are also rectified and applied to the electron discharge device in a manner to reduce the gain of the latter device as the magnitude of the output from the amplifier increases. With the attenuator and bias circuit in association with the electron discharge device, the output of the latter device decreases with an increase in input to this device over a desired range of operation.

Accordingly, it is seen that the electron discharge device and associated circuits function to counteract any changes in the amplitude of the regenerative feedback to the electron discharge amplifier, thereby to stabilize the amplifier.

In another exemplary embodiment an oscillator comprising an amplifier having a degenerative feedback path and a regenerative feedback path is provided. In the degenerative feedback path is located a network having the characteristic of attenuating a predetermined frequency and attenuating less frequencies different from this predetermined frequency. Oscillations will be produced at the frequency at which the degenerative and regenerative feedback balance to produce a net gain through the feedback loops of unity. Accordingly, as the amount of regenerative feedback is increased, the oscillator starts to oscillate at the above-mentioned predetermined frequency since at this frequency the degenerative feedback is least. As the regenerative feedback is further increased, the frequency of oscillation shifts to a value at which the degenerative and regenerative feedback balance.

Thus, in order to stabilize the frequency of oscillation of the oscillator it is essential to stabilize the amplitude of a regenerative feedback. To this end there is provided in the regenerative path an electron discharge device having an attenuator and bias circuits of the kind described in the exemplary embodiment above. As the amplitude of the wave applied to this circuit increases, the output decreases. Accordingly, the regeneration and hence the frequency of oscillation of the oscillator thereby stabilized as will become more fully apparent hereinafter.

A particular application of an oscillator of the above described kind which is highly stabilized with respect to frequency is in selective calling systems used in the radio communication art. Selective calling systems are used so that a central transmitting station can selectively communicate with any one of a group of receiver stations. Each receiver includes circuits responsive to a particular audio frequency or tone corresponding to its call frequency. The central station calls any desired receiver station by momentarily transmitting the call frequency or tone of that receiver. When a large number of receivers are used the call frequencies are closely spaced. Accordingly in order to insure reliable operation, the audio tone generators must be highly stabilized in frequency.

Figure 2:
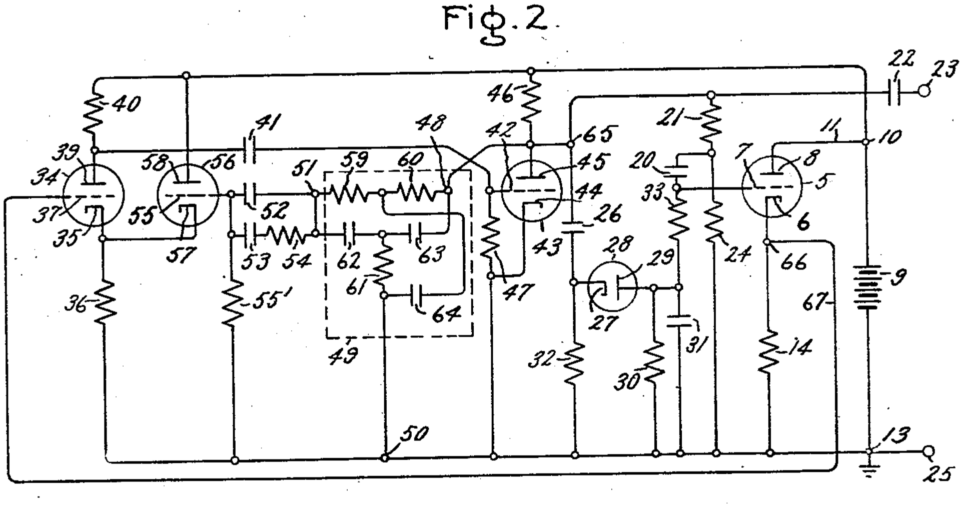

The novel features which I believe to be characteristic of my invention are set forth with particularity in the appended claims. My invention, itself, however, both as to its organization and method of operation, together with further objects and advantages thereof may best be understood by reference to the following description taken in connection with the accompanying drawings in which Fig. 1 is a schematic representation of an amplifier embodying my invention; Fig. 2 is a schematic representation of an oscillator embodying my invention.

Referring now to Fig. 1 there is provided a regenerative amplifier embodying my invention comprising a first electron discharge device 1 including a cathode 2, a grid 3, and an anode 4, and a second electron discharge device 5 including a cathode 6, a grid 7, and an anode 8. A source of unidirectional operating potential 9 is also provided. Positive terminal 10 of source 9 is connected to the anode 8 by conductor 11 and to the anode 4 through load resistance 12. Negative or ground terminal 13 of source 9 is connected to cathode 2 through resistance 14 and to cathode 6 through resistances 14 and 15 connected in series.

Voltages to be amplified are applied between terminal 17 and terminal 19. Terminal 17 is connected to grid 3 through coupling capacitor 16, and terminal 19 is connected directly to ground. Grid 3 is also connected to ground through grid leak resistance 18.

Anode 4 is connected to one end of large resistance 21 and through coupling capacitor 22 to output terminal 23. The other end of resistance 21 is connected to grid 7 through coupling capacitor 20 and to one end of small resistance 24. The other end of resistance 24 is connected to ground and the other output terminal 25. The anode 4 is also connected through coupling capacitor 26 to the cathode 27 of unilaterally conducting device 28 having an anode 29 connected resistance 30 shunted by capacitor 31 to ground. Capacitor 31 and resistance 30 are proportioned so that the charge on capacitor 31 is substantially retained over several cycles of the voltage wave applied to amplifier 1. Resistance 32 connected between ground and cathode 27 completes the current return path for the device 28. Anode 29 is further connected to grid 6 through resistance 33 to supply a bias voltage proportional to the output from device 1. Resistance 33 is made appreciably higher than the reactance of capacitor 31 at the frequency of operation to minimize phase shift in the voltage wave applied from amplifier 1 to grid 7.

In operation, an alternating voltage applied between the input terminals 17 and 19 is amplified by the device 1 and appears across anode load resistance 12 and also across output terminals 23 and 25. The amplified voltage also appears across the voltage divider comprising large resistance 21 and small resistance 24. The portion of the voltage appearing across small resistance 24 is applied to the grid-cathode circuit of device 5. This latter voltage is a relatively small portion of the voltage appearing across the anode load 12. The output from the device 5 is taken from across resistance 14 and applied to the grid-cathode circuit of device 1 in a manner to increase the amplification that normally would be obtained in the latter amplifier in the absence of a reenforcing voltage.

The voltage appearing in the output circuit of electron discharge device 1 is also applied to rectifier 28 to develop a unidirectional bias voltage variable with the mean value of several cycles of the applied voltage. This latter voltage is applied between the grid and cathode of electron discharge device 5 to increase the bias between the grid and cathode of the latter device as the magnitude of the applied voltage increases. It should be noted that the full output voltage is applied to rectifier 28 to derive the bias, while only a small part of the output voltage from amplifier 1 is directly applied between the grid and cathode of the device 5. With this combination of voltages applied in the grid-cathode circuit of device 5 the amplitude of the voltage wave obtained from the output circuit of electron discharge device 5 over a desired range decreases with increasing amplitude of voltage wave appearing in the output circuit of electron discharge device 1.

Accordingly, it is seen that if the output of electron discharge device amplifier 1 increases due to a change in supply voltage, for example, the circuit in association with the electron discharge device 5 acts to counteract any change in the amount of voltage applied to the input circuit of electron discharge device amplifier in regenerative phase, thereby stabilizing the operation of the amplifier.

Referring now to Fig. 2 there is provided an oscillator embodiment of my invention comprising electron discharge device 34, 56, 43 and 5. Electron discharge device 34 includes a cathode 35, a grid 37 and an anode 39. Electron discharge device 56 includes cathode 57, grid 55 and anode 58. Electron discharge device 43 includes cathode 44, grid 42 and anode 45. Electron discharge device 5 includes a cathode 6, grid 7 and anode 8. A source of unidirectional operating potential 9 is also provided. Positive terminal 10 of source 9 is connected to anodes 8 and 58 directly, and to anodes 39 and 45 through resistances 40 and 46, respectively. Negative terminal 13 of source 9 is connected to cathode 44 directly, to cathode 6 through resistance 14 and to cathodes 35 and 57 through resistance 36.

Electron discharge devices 34 and 56 function as an amplifier. Output waves appearing across resistance 40 are applied to electron discharge amplifier 43 through coupling capacitor 41 connected between anode 39 and grid 42. Grid leak resistance 47 is connected between grid 42 and ground.

The output from amplifier 43 is applied in degenerative phase to amplifier 34, 56 through filter network 49 having an input terminal 48, an output terminal 51 and a common terminal 50. The anode 45 of electron discharge amplifier 43 is connected to input terminal 48. Common input and output terminal 50 is connected to ground. The output terminal 51 of network 49 is connected through capacitor 52 shunted by a series combination of capacitor 53 and resistance 54 to grid 55 of electron discharge device 56. Grid 55 is connected to ground through grid leak resistance 55′.

Network 49 comprises resistances 59, 60, 61 and capacitances 62, 63 and 64. Resistances 60 and 59 are connected in series between input and output terminals 48 and 51, respectively, and capacitor 64 is connected between the junction of these resistances and the common terminal 5. Capacitors 63 and 62 are connected in series between input terminal 48 and output terminal 51 and the junction of these capacitors is connected to ground through resistance 61. When the resistances and capacitances of network 49 are proportioned so that:

Resistance 59=Resistance 60
Capacitance 62=Capacitance 63
Capacitance 64=2×Capacitance 62
Resistance 61=½×Resistance 59 then the transmission characteristic of the network 49 is such that at a center frequency determined by the relationship:

$$\text{center frequency}=\frac{1}{2\pi\times\text{Resistance 59}\times\text{Capacitance 62}}$$

voltage waves applied between input terminals 48 and 52 are not transmitted to the output terminals 51 and 50. However, at frequencies on either side of the center frequency the transmission of the waves increases with the increase in departure from the center frequency. Thus, the feedback through discharge device 43 and network 49 is zero at the center frequency of the network 49 which is substantially the frequency of oscillations to be regenerated and which may be any audio frequency, for example, 500 cycles and is degenerative at frequencies both above and below that center frequency. Thus, the discharge devices 34 and 56 do not generate oscillations except as hereinafter described.

The network 49 also has the characteristic of producing zero phase shift at the center frequency and producing phase shift which varies very rapidly with frequency departures from the predetermined frequency and which has a direction dependent upon the direction of frequency departure from the predetermined frequency. The significance of this characteristic will be brought out below in connection with the explanation of the operation of the oscillator.

The network comprising capacitors 52, 53 and resistance 54 is known as an "anti-thumping" network and functions to prevent self oscillation of the amplifier at frequencies below the frequency of oscillations to be generated and particularly at frequencies of the order of a few, as for example, 3 cycles per sec.

The output from the amplifier 43 is also applied in regenerative phase from anode 45 to amplifier 34, 56 through stabilization circuit comprising electron discharge device 5, unilaterally conducting device 28 and associated circuit elements. The stabilization circuit of this figure is identical in structure and operation to the stabilization circuit of Fig. 1 and the elements of this circuit corresponding to the elements of Fig. 1 have the same reference numerals. The input terminal 65 of the stabilization circuit is connected to anode 45 and the output terminal 66 of the stabilization circuit is connected through conductor 67 to grid 37.

As pointed out above the oscillator will oscillate when the regenerative feedback balances the degenerative feedback to produce a net feedback loop again around the feedback paths of unity. This occurs at substantially the center frequency of the network 49, since at this frequency the degenerative feedback through the network is smallest and the degenerative feedback increases above and below this frequency.

In an actual circuit the coupling elements between stages, for example, capacitor 41 and resistance 47, produce small amount of phase shift so that the voltage appearing at anode 45 is not exactly in phase with the voltage appearing at grid 37. It is also to be noted that the phase of the output from network 45 with respect to its input varies from zero at the center frequency to leading and lagging values as the frequency of the applied voltage changes in one direction or the other direction from the center frequency of the network. Accordingly, the feedback from the output circuit of device 34 to the input circuit thereof will be exactly 180 degrees out of phase at a frequency which is determined by the phase shift versus frequency characteristic of the network 49. For this reason the oscillator will oscillate at a frequency slightly different from the center frequency of the network 49.

Since the oscillator oscillates at substantially the frequency at which the regenerative and degenerative feedback balance as pointed out above, an increase in the amount of regenerative feedback calls for an increase in degenerative feedback for the above relationship to hold. To increase the degenerative feedback back through the network 49, the frequency of oscillation has to shift away from the center frequency by an amount required to give the right amount of degenerative feedback. Thus, it is seen that in order to stabilize the frequency of oscillation of the oscillator it is necessary to stabilize the amount of regenerative feedback.

Applicant's circuit comprising devices 5 and 28 and associated circuits function in a manner pointed out in connection with Fig. 1 to produce an output which varies in inverse relationship to the input. Thus, the amount of regenerative feedback is maintained substantially constant, thereby maintaining the frequency of the oscillator highly stabilized. By means of applicant's circuit it has been possible to stabilize the frequency of operation of an oscillator of the kind described herein to a very high degree, comparable to the degree of stability obtainable with crystal oscillators.

While I have shown particular embodiments of my invention it will of course be understood that I do not wish to be limited thereto since many modifications, both in the circuit arrangement and in the instrumentalities employed may be made, and I, therefore, contemplate by the appended claims to cover any such modifications as fall within the true spirit and scope of my invention.

What I claim as new and desire to secure by Letters Patent of the United States is:

1. In combination, an electron discharge amplifier, an electron discharge device having a cathode, a grid and an anode, means for energizing the anode-cathode electron discharge path of said device, a load impedance connected in the anode-cathode circuit of said device, means for applying a small portion of the output of said first amplifier between the grid and cathode of said device, means for rectifying the output of said amplifier and applying said rectified output to bias said grid with respect to said cathode an amount inversely dependent upon the magnitude of the output of said amplifier, and means for applying a portion of the output appearing across said load impedance to the input circuit of said first amplifier to increase the output of said first amplifier, thereby to stabilize the operation of said amplifier at a desired range of amplification.

2. In combination, an electron discharge amplifier, an electron discharge device having a cathode, a grid and an anode, means for energizing the anode-cathode path of said electron discharge device, a resistance connected in circuit between said grid and cathode in shunt with the anode-cathode electron discharge path of said device, means for applying a small portion of the output of said first amplifier between the grid and cathode of said device, means for rectifying another portion of the output of said amplifier and applying said rectified output to bias said grid with respect to said cathode an amount inversely dependent upon the magnitude of the output of said amplifier, whereby the output appearing across said resistance decreases as the output from said amplifier increases, means for applying a portion of the output across said resistance to the input circuit of said amplifier in regenerative phase to increase the output of said first amplifier, thereby to stabilize the operation of said amplifier at a desired range of amplification.

3. In combination, a first electron discharge amplifier having an input circuit and an output circuit, a second electron discharge amplifier having an input circuit and an output circuit, means for applying a first portion of the output of said first amplifier to the input circuit of said second amplifier, unilateral impedance means for rectifying another portion of the output of said first amplifier, means coupling the output of said unilateral impedance means to the input of said second amplifier to bias said second amplifier in a direction to decrease the output of said second amplifier as the output of said first amplifier increases, and means for coupling the output circuit of said second amplifier to the input circuit of said first amplifier whereby the output voltage of said first amplifier is stabilized.

4. A circuit for stabilizing the operation of an amplifier comprising first and second amplifiers each having an input circuit and an output circuit, voltage dividing means connected between the output circuit of said first amplifier and the input circuit of said second amplifier for supplying a portion of the output voltage of said first amplifier to the input circuit of said second amplifier, means for coupling the output circuit of said second amplifier to the input circuit of said first amplifier in phase relation to provide regenerative feedback between the output of said second amplifier and the input of said first amplifier, and means responsive to an increase in amplification of said first amplifier to reduce the amplification of said second amplifier thereby reducing the feedback to said first amplifier.

References Cited in the file of this patent

UNITED STATES PATENTS

| | | |
|---|---|---|
| 2,303,485 | Meacham | Dec. 1, 1942 |
| 2,507,695 | Dean | May 16, 1950 |
| 2,525,103 | Sprecher | Oct. 10, 1950 |
| 2,562,894 | Mengel | Aug. 7, 1951 |
| 2,591,249 | Gannaway | Apr. 1, 1952 |
| 2,623,954 | Van Zelst | Dec. 30, 1952 |

FOREIGN PATENTS

| | | |
|---|---|---|
| 644,083 | Great Britain | Oct. 4, 1950 |